United States Patent Office 3,119,183
Patented Jan. 28, 1964

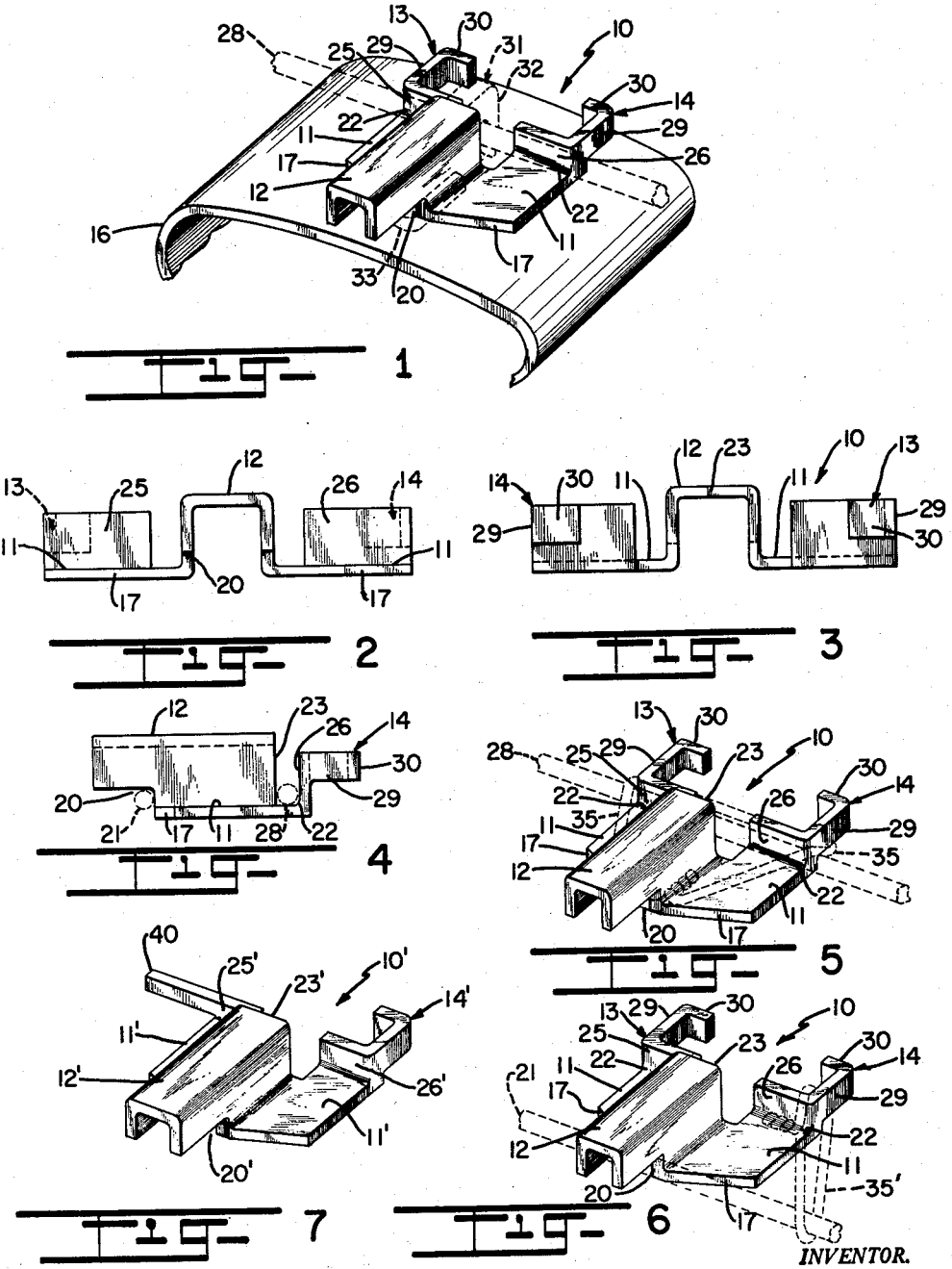

3,119,183
ORTHODONTIC APPLIANCE
Paul I. Bauman, 704 Glebe Road, Arlington, Va.
Filed Nov. 24, 1961, Ser. No. 154,763
5 Claims. (Cl. 32—14)

This invention relates to a new and useful orthodontic bracket, and more particularly relates to an orthodontic bracket which serves as a means of attachment for relatively light wires to a tooth in order to apply the desired correctional forces thereto.

As principal features of the present invention, a bracket has been devised, of unitary construction, which is compact and extremely lightweight. The bracket is conformable for use in the correction of various tooth maladjustments, while assuring freedom of wire and tooth movements during all stages of treatment. In addition, the bracket is so constructed and arranged as to provide for the direct transfer of correctional forces to the tooth and to provide for utmost ease of attachment both of arch wires and ligature wires, either to apply axial, rotational, elongational or depressional forces.

Accordingly, it is a principal and foremost object of this invention to provide for an orthodontic bracket which is extremely compact and lightweight while being adapted for the direct application of correctional forces to a tooth or series of teeth in the desired direction.

It is a further object to make provision for an orthodontic bracket adapted to be secured to a tooth band in encircling relation to a tooth, which bracket enables secure support and anchorage of arch wires and ease of attachment of ligature wires to apply the desired axial or rotational forces to the tooth.

It is an additional object of the present invention to make provision for an orthodontic bracket which is of unitary construction, easily produced and applied for use in correcting misaligned teeth, and specifically whereby a greatly improved form of arch and ligature wire attaching means is included to apply correctional force in the desired direction between the arch wire and tooth.

It is a still further object of the present invention to provide for an orthodontic bracket specifically adapted for use in conjunction with relatively light arch wires and in which the bracket includes a combined ledge and hook construction for connection and support of an arch wire and ligature wires to apply the desired correctional force to a tooth.

The above and other objects, advantages and features of the present invention will become more readily understood from the following detailed description taken together with the accompanying drawing, in which:

FIGURE 1 is a somewhat perspective view of a preferred form of orthodontic bracket, shown in connected relation to a tooth band;

FIGURE 2 is a bottom view of the preferred form of orthodontic bracket shown in FIGURE 1;

FIGURE 3 is a top view of the preferred form of orthodontic bracket shown in FIGURE 1;

FIGURE 4 is a side view of the preferred form of bracket;

FIGURES 5 and 6 illustrate typical ways of utilizing the bracket of the present invention to apply correctional forces to teeth; and FIGURE 7 is a somewhat perspective view of an alternate form of orthodontic bracket, in accordance with the present invention.

Referring in detail to the drawing, in the preferred form, an orthodontic appliance in the form of a bracket 10 broadly consists of a body having side securing portions defined by flanges 11 flanking a centrally disposed, vertical channel portion 12, and hook members 13 and 14 form upper extensions of the side securing portions 11.

In composition, the bracket of the present invention may be of sheet metal construction, and the various elements thereof may be formed in a single stamping or shaping operation.

More specifically, the side securing portions 11 serve as a means of attachment for the entire bracket to a tooth band 16 such as by weld applied between the contacting surfaces of the side securing portions 11 and tooth band 16. In assembled relation, the channel 12 continues beyond lower edges 17 of the flanges 11 so as to form between the channel and tooth band an open, downwardly facing slot 20 for reception of an arch wire 21. The edges 17 of the flanges 11 incline upwardly and away from the channel at the base of the slot in order to afford complete freedom of movement of the arch wire 21, and also to reduce the amount of material necessary in formation of the bracket. The flanges 11 also continue upwardly, as at 22, beyond top surface 23 of the channel and terminate in overhanging, outwardly extending ledge portions 25 and 26 which form with area 22 and top surface 23 an outwardly facing slotted portion or platform for reception of an arch wire 28.

In order to retain the arch wire 28 in place, the channel 12 forms a retainer for insertion of a pin 31. As seen from FIGURE 1, the pin broadly includes an enlarged head portion 32 which rests against the top surface of the arch wire and a lower end portion 33 which, as illustrated, is adapted to be bent upwardly and around the channel to lock the pin securely in place therein. Both the channel and pin can be of any desired cross section, such as rectangular or circular, and as shown in the preferred form are of rectangular cross section.

In order to apply either rotational or axial forces through the bracket, and in a unique manner, the hook members 13 and 14 are preferably formed to extend upwardly from the ledge portions 25 and 26 at opposite sides of the bracket in transverse offset relation to the plane of the side securing portions 11. Each hook is similarly constructed to have a flat, substantially vertical intermediate portion 29 and flat, laterally extending terminal end portions 30. The terminal end portions are preferably directed from the intermediate portions toward one another and are made relatively short so as to allow for ample spacing between the hooks. In this manner, also, the hooks are formed so as not to project outwardly away from the surface of the bracket and thus avoid any discomfiture to the mouth. The necessity of projecting the hook members outwardly is avoided by forming them in offset relation to the tooth band and bracket itself and in this way ligature wires 35, for example as shown in FIGURES 5 and 6, can easily be looped over or passed through the hooks and held securely in place against accidental displacement, then tied around the arch wire 28. It will be evident from the relationship established between the hooks and bracket as a whole that the hooks provide relatively large supporting portions for the ligature wires and provide for interconnection between the arch wire or arch wires and bracket in a number of ways.

In FIGURES 1, 4 and 5 typical examples of interconnection between the arch wires and bracket are shown. In FIGURE 1, for example, the arch wire 28 may merely be positioned in the slotted area formed above the channel 12 and, without aid of the pin, would be effective to apply an inward axial force through the tooth band against the tooth; the ledges 25 and 26 together with the upper end of the channel would be effective to hold the arch wire in place, or the ledges or channel may be crimped slightly to retain the arch wire in place without use of the pin. Where desired, rotational control can be established by inserting the pin, shown in FIGURE 1, to securely hold the arch wire between the pin and the top of the channel 12. Also, as further shown in FIGURE 4, a pair of arch wires 21 and 28 may be positioned in the lower slotted area 20 and upper slotted area 22, respectively, and in this relation can be used to effectively control depression or elongation of teeth particularly in the later stages of treatment without the use of special retaining means. Here again, light resilient arch wires are preferably employed which, through the bracket, will apply the desired force to the tooth and in an even manner; it will be noted also that this arrangement may be used in exerting axial control on a tooth.

Rotational control is most effectively established through the combined use of an arch wire and ligature wires. FIGURE 5 represents one manner of employing ligature wires where the ligature wire 35 is looped through the open area behind the hooks 13 and 14 then drawn over the arch wire 28, through the lower slot 20 and effectively tied in place. Thus, rotational control is established without the use of additional connecting or retaining means, such as the pin 31. More localized rotational control can be effectively accomplished through the relationship shown in FIGURE 6 where the arch wire 21 is inserted in the slot 20 and ligature wire 35' is looped around the hook 14 and around the arch wire 21 then tied together to apply an upward force on the arch wire. In this relation, combined axial and rotational forces may be established, again without the use of special pin securing means. It will be further apparent from this that either of the hooks can be employed as a means of connection for the ligature wire with an arch wire passing through the upper slotted area above the channel 12, or both hooks may be simultaneously employed with separate ligature wires extending between each hook and the arch wire. Moreover, where two or more brackets are employed on a pair, or more, of teeth, ligature wires may be tied between adjacent hooks on the separate brackets to establish tooth-to-tooth tie-ups.

It will be apparent from the above that the bracket of the present invention is conformable for use in establishing connection or attachment of either one or two arch wires to a tooth to apply the desired correctional force thereto. Selective use of ligature wires in association with the arch wires not only eliminates the need for other retaining means for the arch wire but also can be easily attached to the bracket and can be employed in a number of ways, particularly in effecting rotational movement of the tooth in the desired direction. The hooks are useable independently or together and, along with the ledge portions, can apply any desired degree of force in combination with the arch wire to the tooth and at any stage of treatment.

FIGURE 7 illustrates a modified form of the present invention where a bracket 10' again is broadly comprised of side securing portions or flanges 11', a central vertical channel 12' formed with a lower slotted portion 20' and top surface 23', and ledge portions 25' and 26'. As before, one hook member 14' continues upwardly from the ledge portion 26'; however, on the opposite side, the ledge includes an outward lateral extension 40 similarly in offset relation to the tooth band but in such a way as to form a greater supporting area along the arch wire slotted area to enable more axial control as applied by the arch wire through the bracket in a horizontal or lateral direction. Similarly, if desired, the outward extension 40 can be used as a means of connection for a ligature wire and arch wire in preference to the use of a pin.

It will be seen from the foregoing that preferred and alternate forms of orthodontic bracket have been devised which, depending upon their size, are adapted for use either with relatively light, resilient arch wires or with the more conventional larger arch wires to accomplish greatly improved results. In this connection, it will be understood that various changes in the size, form, construction and composition of the various forms of the present invention may be made and substituted for those shown and described herein without departing from the scope of the invention as defined by the appended claims.

What is claimed is:
1. An orthodontic bracket comprising flange securing portions for attachment to a tooth encircling band, a vertical channel between said flange securing portions projecting substantially perpendicularly and outwardly therefrom; an offset portion defining an upward continuation of said flange securing portions in an occlusal direction including outwardly projecting ledges spaced occlusally from said occlusal end of said channel, the outside surfaces of said ledges forming with the occlusal end of said channel an outwardly facing arch wire receiving slot, and a pair of spaced hook members extending occlusally from said ledges in outer spaced relation to the tooth band, said hook members having terminal ends directed toward one another in spaced relation occlusally of said ledges.

2. An orthodontic bracket according to claim 1, said channel extending gingivally beyond the lower end of said flange securing portions in outer spaced relation to the tooth band to define a gingivally facing, arch wire receiving slot, and said flange securing portions having lower edges inclining occlusally and away from the base of said gingivally facing slot.

3. An orthodontic bracket comprising a channel with a gingival and an occlusal end; a flat base section attached to either side of said channel, said bracket constructed for mounting on a tooth band with said base sections attached to the band and with said channel substantially parallel to the vertical axis of a tooth, said channel terminating at its gingival end in a lower offset portion extending beyond the gingival ends of said sections to form a gingivally located arch wire receiving slot between its lower edges and the top surface of the band; and an outwardly projecting ledge located occlusally of the occlusal end of said channel attached to each of said sections whereby an occlusally located arch wire receiving slot is formed between the occlusal end of said channel and the gingivally facing faces of said ledges; and an offset hook extending occlusally from the outer edge of each of said ledges.

4. The orthodontic bracket of claim 3 in which terminal end portions are provided on each of said hooks facing inwardly.

5. The bracket of claim 3 in combination with an arch wire in each slot and means securing the arch wire in the slot.

References Cited in the file of this patent

UNITED STATES PATENTS

| | | |
|---|---|---|
| 618,105 | Knapp | Jan. 24, 1889 |
| 1,481,861 | Eaton | Jan. 29, 1924 |
| 2,716,283 | Atkinson | Aug. 30, 1955 |
| 2,926,422 | Wallshein | Mar. 1, 1960 |
| 2,958,945 | Waldman | Nov. 8, 1960 |

OTHER REFERENCES

Rocky Mountain Summary Price List (for the A.A.O. 1961 meeting in Denver, Colorado), received in Patent Office May 15, 1961. Copy in Div. 55 in 32–14, page 16 relied upon.